United States Patent Office 3,219,017
Patented Nov. 23, 1965

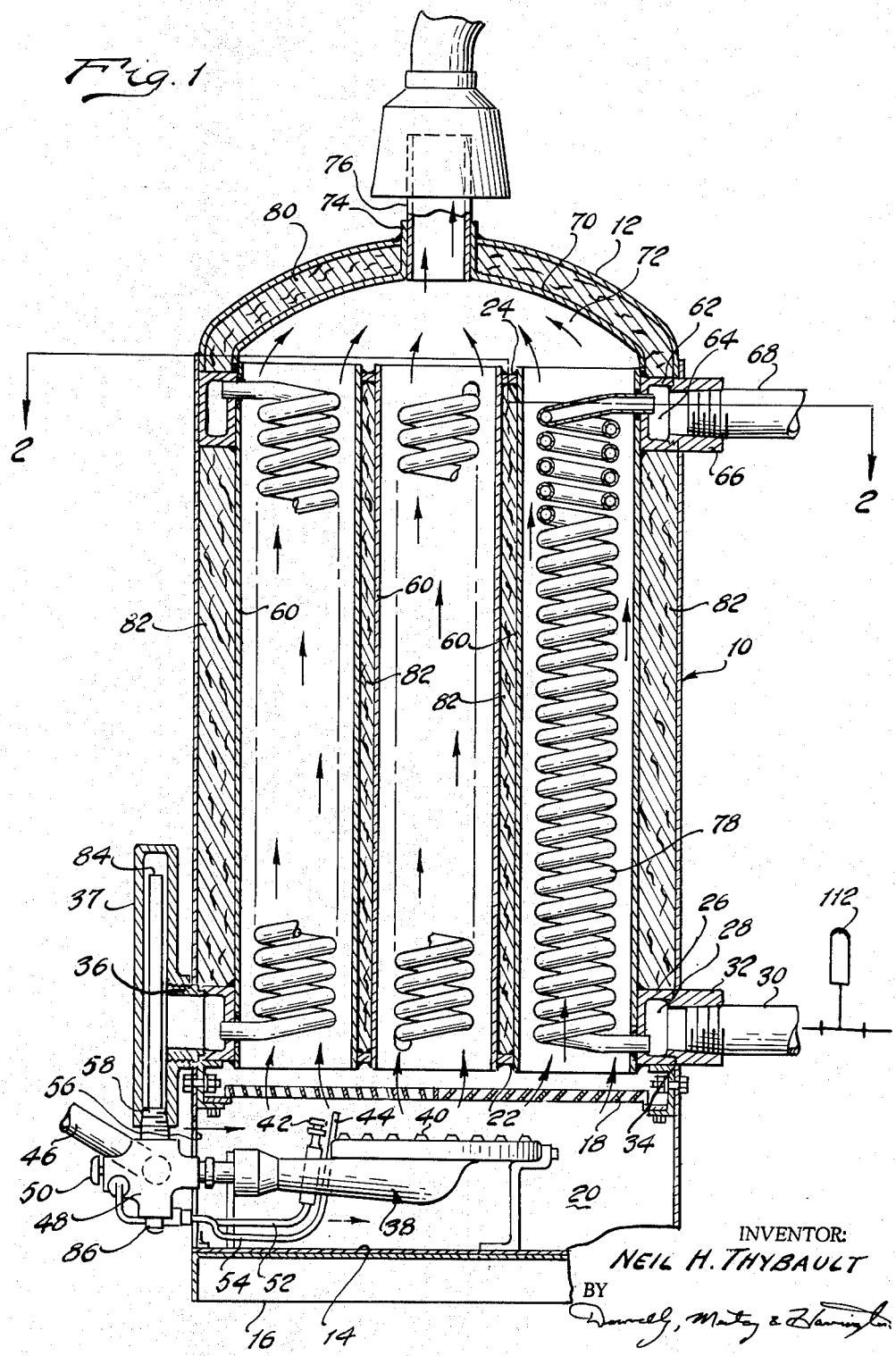

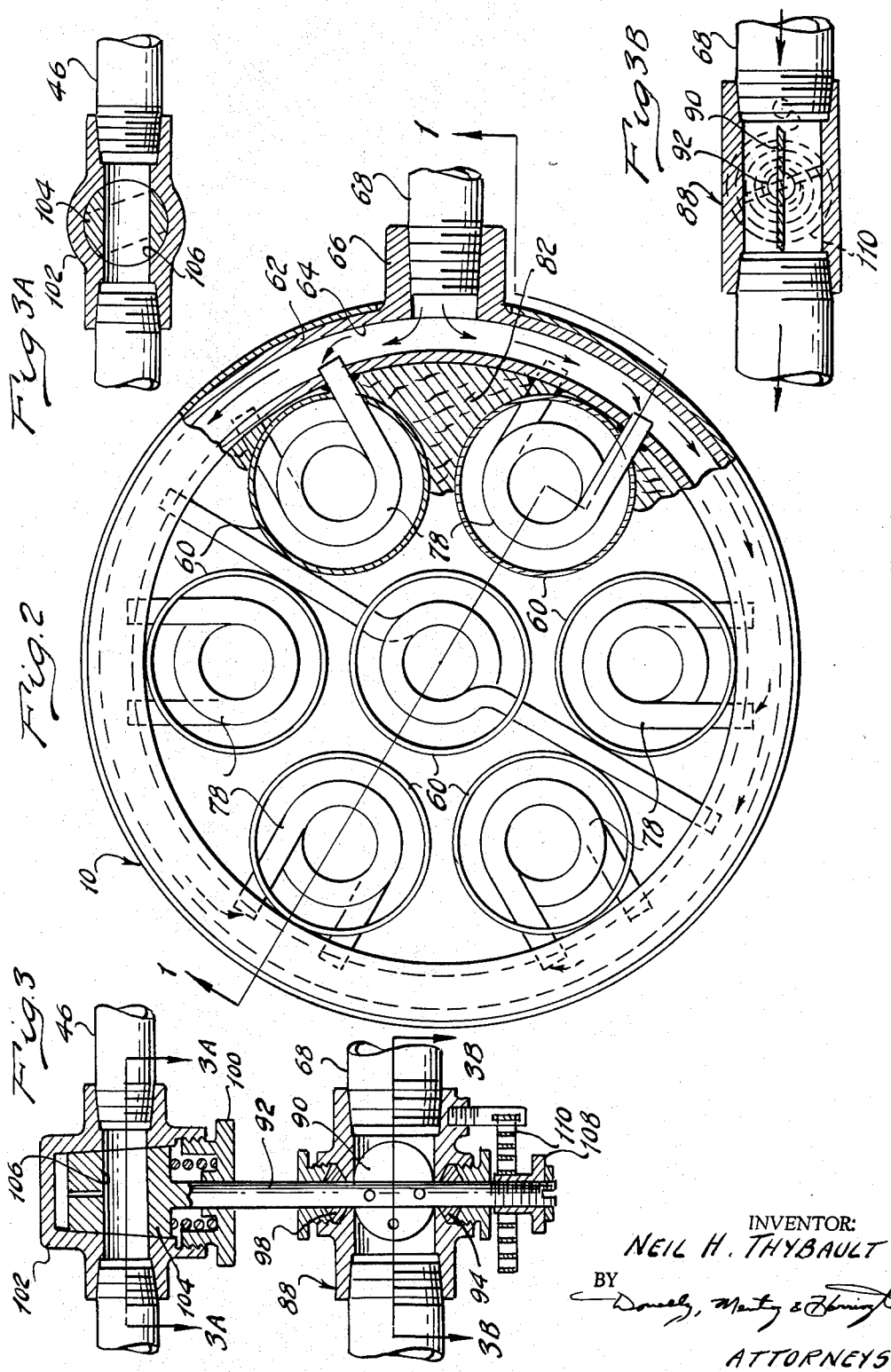

3,219,017
WATER HEATER HAVING MULTIPLE HEATING COILS ARRANGED IN PARALLEL FLOW PATHS
Neil H. Thybault, 10365 M-15 Highway, Clarkston, Mich.
Filed Aug. 27, 1962, Ser. No. 219,677
2 Claims. (Cl. 122—250)

My invention relates generally to automatic water heaters, and more particularly to a new and improved water heater of simplified construction. According to a principal feature of my invention, I have provided an insulated casing within which are situated heater coils that are arranged in a household water supply line. The coils define parallel flow paths and they are situated individually within separate heating ducts. Heated air passes upwardly through the ducts upon application of heat to a lower chamber. The heat source may be in the form of a gas burner that is controlled automatically in response to the flow of water through the coils, the amount of gas supplied to the burner being determined by the rate of flow of water through the coils. Each of the ducts is insulated individually and provision is made for distributing the heated air in a substantially uniform fashion through the various ducts.

The ducts are arranged in a composite fashion to provide minimum overall dimensions of the unit for any given heating capacity.

My invention is characterized by its ability to provide a supply of hot water instantaneously upon demand. It includes a gas burner for heating the water and improved controls that are responsive to the demand upon the heater for controlling the burner.

The provision of an improved water heater of the type set forth being a principal object of my invention, it is a further object of my invention to provide a water heater that responds instantaneously to demand and which does not require the use of a reservoir for accumulating hot water.

It is a further object of my invention to provide a heater of the type above set forth which includes a gas burner and wherein provision is made for operating the gas burner only when a supply of hot water is required.

It is a further object of my invention to provide a water heater of simplified construction wherein a plurality of heating coils arranged in parallel relationship are disposed in isolated, insulated chambers whereby the heating efficiency is augmented.

It is a further object of my invention to provide a water heater of the type above set forth wherein the corresponding ends of the parallel heating coils communicate respectively with a water intake manifold and a hot water outlet manifold.

It is a further object of my invention to provide a heater of the type above set forth which is characterized further by its simplified construction and which may be constructed by known manufacturing techniques.

For the purpose of describing more particularly my invention, reference will be made to the accompanying drawings wherein, FIG. 1 shows a cross-sectional assembly view of my improved heater, FIG. 2 is a sectional view taken along section lines 2—2 of FIG. 1, and, FIGS. 3, 3A and 3B show a schematic valve diagram of the water and gas control valves for my improved heater.

Referring first to FIGS. 1 and 2, numeral 10 generally designates the outer shell of a cylindrical casing. The upper end of this cylindrical casing 10 is closed by a crown cover portion 12. The lower end of the cylindrical casing 10 is closed by an apertured plate 14 that in turn rests upon a suitable standard 16. A grid 18 is situated transversely of the casing 10 within its interior as indicated thus defining a lower chamber 20 that is semi-isolated from the upper portion of the interior of casing 10.

Transversely disposed within the casing 10 is a wall at the lower portion thereof. This wall is identified by the reference numeral 22. In a similar fashion, a wall 24 is situated at the uppermost end of the casing 10 in transverse relationship. Interposed between the margin of wall 22 and the inner surface of the casing 10, is a water outlet manifold 26. This manifold 26 is circular in form and defines an annular cavity 28.

A water outlet conduit is shown at 30 and it communicates with the interior of the manifold 26 through a suitable fitting 32. The fitting 32 can be aligned with a suitable opening formed in the casing 10. The manifold 26 can be secured in place by an angle bracket 34 that can be bolted to the interior of the casing 10 as shown. The wall 22 can be welded or otherwise secured at its periphery to the manifold 26.

A thermocouple housing 37 is connected threadably to an extension 36 that in turn is received threadably within an opening in the manifold 26 as indicated. Extension 36 projects through an opening in casing 10. The interior of the thermocouple housing 37 is thus in fluid communication with the interior 28 of the manifold 26.

A gas burner is generally identified by reference character 38 and is situated within the chamber 20. It includes burner jets 40 and a pilot burner 42. An additional control thermocouple 44 is provided for causing the controls to turn off the gas supply if the pilot burner 42 is not functioning.

Gas is supplied to the burner 38 through a gas intake conduit 46 that communicates with a gas control assembly 48. The burner 38 and the assembly 48 define a composite burner assembly. A main burner control is shown at 50 and the control lines extending to the pilot burner 42 and the thermocouple 44 are shown at 52 and 54, respectively.

The burner 38 is adapted to be received within an access opening 56 formed in the casing 10.

The thermocouple housing 37, which is in communication with manifold 26, is connected to the control assembly 48 by a suitable fitting 58.

The wall 22 and the wall 24 are formed with a plurality of openings preferably seven in number. Cylindrical tubes 60 are received within these openings and they form parallel ducts, the diameter of the tubes being substantially equal to the diameter of the openings. The upper end of each tube 60 is welded about its periphery to the wall 24. In a similar fashion the periphery of the lower end of the tube 60 is mounted in the wall 22. The periphery of the wall 24 is secured to a water intake manifold 62 that in turn is received within the upper end of the casing 10. The manifold 62 encloses an annular cavity 64 that is apertured to correspond to an aperture in casing 10 through which a fluid fitting 66 extends. A water intake conduit 68 is connected to the fitting 66.

A second crowned cover portion 70 is disposed above the manifold 62. It is spaced from the cover portion 12 and it defines an upper flue chamber 72. The center of the portion 70 is flanged upwardly to define a cylinder 74 within which a flue chimney 76 is disposed.

Situated within each tube 60 is a heating coil 78 having multiple turns. Preferably the coils 78 are formed of maleable material such as copper. The lower end of the coil 78 communicates with the interior 28 of the manifold 26. If desired, the connections between the coils 78 and manifold 26 can be formed by brazing. In a similar fashion the upper ends of the coils 78 communicate with the interior 64 of the manifold 62. Again, a brazing operation can be employed if desired.

The space between the cover portions 12 and 70 is filled with insulating material such as fiberglass. This is indicated by reference character 80. In a similar fashion, the entire space within the cylindrical casing 10, with the exception of the space occupied by the tubes 60, is filled with insulating material 82 such as fiberglass. Thus the tubes 60 are insulated from the casing 10 and are insulated also from each other.

During operation, water enters the intake manifold 62 and is distributed through a parallel circuit through the coils 78. As the water passes through the coils 78, it becomes heated by the heated air that passes upwardly through the tube 60. The heated air is obtained from chamber 20. The heated air then is collected in flue chamber 72 and passed out the stack or chimney 76.

The grid 18 functions to distribute uniformly the heated air from the chamber 20 to the tubes 60. The air in chamber 20, of course, is heated by the burner 38. Grid 18 functions also to protect the tubes 60 and the coils 78 from direct contact with the flames of jets 40.

A thermocouple 84 is situated within the housing 37. This thermocouple 84 and the previously described thermocouple 44 function to control the burner 38 by interrupting the supply of gas to the burner 28 if the pilot burner should fail or if the water temperature exceeds the value that is determined by the setting of the main burner control 50. A pilot burner reset button is shown at 86. The controls of assembly 48 of which the reset mechanism and the burner control mechanism form a part is of conventional construction and will not be further described.

Referring next to FIGS. 3, 3A and 3B, I have illustrated schematically a control system for regulating the supply of gas to the burner 38 in response to flow of water through the coils 78. This mechanism is situated preferably in the intake conduit 68. The controls include a section 88 of substantially circular cross-section. Disposed within section 88 is a butterfly valve 90 that is carried by an off-set, rotary shaft 92. Shaft 92 extends through a suitable fluid seal packing 94 at one side of the section 88 and through another suitable packing 98 at the other side.

A valve housing is shown at 102. A cylindrical valve element 104 is situated within the housing 102 and is apertured as shown at 106. The gas supply line 46 communicates with the interior of the housing 102. When the valve element 104 is positioned as shown, opening 106 communicates with the conduit 46 thus accommodating free flow of gas through the conduit 46. The valve element 104 is situated in the position shown in FIG. 3 whenever the water passes through the conduit 68 in the direction of the arrow in FIG. 3B. The flow of water through the conduit 68, of course, positions the butterfly valve 90 so that it becomes aligned with the direction of flow.

The lower end of the shaft 92 as viewed in FIG. 3 extends through a spring retainer and adjusting member 108 to which is connected a coil spring 110 at one end. The other end of the spring 110 is connected to a stationary part of section 88. The spring 110 functions to return the shaft 92 to a flow blocking position whenever the flow through the conduit 68 is interrupted.

By means of the controls shown in FIGS. 3, 3A and 3B, gas is supplied to the burner 38 only when the household user opens the faucet or petcock that normally would be in conduit 30. As soon as water flows through conduit 30, the butterfly valve 90 will move to the open position thus allowing gas to be fed to the burner 38 whereupon it is ignited by the pilot burner 42. Thus the burner is operating only during those instances when water is being drawn through the conduit 30.

The number and length of the coils 78 can be varied to meet any normal design requirement for household purposes.

If servicing is required, the coils 78, the tubes 60 and the manifolds 26 and 62 can be removed readily from the casing 10 merely by unbolting the brackets 34 and by withdrawing the sub-assembly through the lower end of the casing 10. The apertured lower plate 14 of the casing 10 can readily be made removable by appropriate brackets. The apertures in the plate 14 and the access opening 56 provide air for the burner 38.

If desired, a safety valve 112 can be situated within the outlet conduit 30. This can be in the form of a pressure relief valve of conventional construction.

Having thus described the principal features of my invention, what I claim and desire to secure by U.S. Letters Patent is:

1. A hot water heater comprising a casing, a gas burner located in the lower portion of said casing, a first water manifold situated at the upper portion of said casing, a second water manifold situated at the lower portion of said casing, each manifold communicating with a water flow conduit, a plurality of hot air ducts disposed within said casing, a heating coil disposed in each duct, one end of each coil communicating with one manifold and the other end of each coil communicating with the other manifold to provide parallel circuits between said manifolds, a first wall disposed transversely within said casing, and a second wall formed transversely within said casing in spaced relationship with respect to said first wall, said ducts extending through said walls and secured therein, the margin of said walls being secured to said manifolds, said walls, said ducts and said manifolds thereby defining a composite subassembly, means for removably securing said subassembly within said casing whereby said subassembly can be removed by withdrawing the same through one end of said casing, a heating means controlled in response to the flow of water in said conduits for establishing hot air flow through said ducts, and a grid between said heater means and said ducts, said grid being adapted to distribute uniformly heated air to said ducts.

2. A hot water heater comprising a casing, a gas burner located in the lower region of said casing, a first water manifold situated at the upper portion of said casing, a second water manifold situated at the lower portion of said casing, each manifold communicating with a water flow conduit, a plurality of hot air ducts disposed within said casing, a heating coil disposed in each duct, one end of each coil communicating with one manifold and the other end of each coil communicating with the other manifold to provide parallel circuits between said manifolds, said burner being adapted to establish hot air flow through said ducts, and a grid between said burner and said ducts, said grid being adapted to distribute uniformly heated air to said ducts, and insulating material disposed within said casing and surrounding said ducts whereby said ducts are isolated from said casing and from each other.

References Cited by the Examiner
UNITED STATES PATENTS

| | | | |
|---|---|---|---|
| 348,932 | 9/1886 | Rugg | 122—240 |
| 647,758 | 4/1900 | Orr | 122—250 |
| 941,784 | 11/1909 | Kinkade | 236—25 |
| 993,246 | 5/1911 | Hart | 122—250 |
| 2,009,193 | 7/1935 | Hegwein et al. | 236—25 |
| 2,744,510 | 5/1956 | Tyler et al. | 137—527 |
| 2,823,652 | 2/1958 | Mader | 122—250 |
| 3,018,635 | 1/1962 | Keckler | 137—595 |

MEYER PERLIN, *Primary Examiner.*

PERCY PATRICK, *Examiner.*